(12) United States Patent
Bailey et al.

(10) Patent No.: US 7,093,243 B2
(45) Date of Patent: Aug. 15, 2006

(54) SOFTWARE MECHANISM FOR EFFICIENT COMPILING AND LOADING OF JAVA SERVER PAGES (JSPS)

(75) Inventors: Byron Lewis Bailey, Rochester, MN (US); Arthur Douglas Smet, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 737 days.

(21) Appl. No.: 10/267,966

(22) Filed: Oct. 9, 2002

(65) Prior Publication Data

US 2004/0073552 A1    Apr. 15, 2004

(51) Int. Cl.
G06F 9/44    (2006.01)
G06F 9/45    (2006.01)
G06F 9/455   (2006.01)

(52) U.S. Cl. .............. 717/166; 717/106; 717/148; 717/153; 718/1

(58) Field of Classification Search ............. 717/134, 717/165–167, 106, 148, 153; 718/1, 100–108
See application file for complete search history.

(56) References Cited

U.S. PATENT DOCUMENTS

| | | | | |
|---|---|---|---|---|
| 5,367,680 A * | 11/1994 | Flurry et al. | ............... | 718/107 |
| 5,481,719 A * | 1/1996 | Ackerman et al. | .......... | 718/108 |
| 5,966,072 A * | 10/1999 | Stanfill et al. | ............... | 340/440 |
| 6,223,346 B1 * | 4/2001 | Tock | ........................... | 717/166 |
| 6,393,605 B1 * | 5/2002 | Loomans | ................... | 717/121 |
| 6,405,367 B1 * | 6/2002 | Bryant et al. | ............... | 717/115 |
| 6,536,035 B1 * | 3/2003 | Hawkins | ..................... | 717/100 |
| 6,697,849 B1 * | 2/2004 | Carlson | ...................... | 709/219 |
| 6,873,984 B1 * | 3/2005 | Campos et al. | ............... | 707/6 |
| 6,889,257 B1 * | 5/2005 | Patel | ........................ | 709/232 |
| 6,973,491 B1 * | 12/2005 | Staveley et al. | ............ | 709/224 |
| 2003/0105884 A1 * | 6/2003 | Upton | ........................ | 709/318 |
| 2003/0163510 A1 * | 8/2003 | Janssen | ..................... | 709/100 |

OTHER PUBLICATIONS

"JavaServer Pages™ Whitepaper: A Simplified Guide", Sun Microsystems, accessed on Nov. 23, 2005 and archived Aug. 6, 2001 at <http://web.archive.org/web/20010806084239/http://java.sun.com/products/jsp/jspguide-wp.html>.*

Marty Hall, "More Servlets and JavaServer Pages™", Dec. 26, 2001, Prentice Hall, ISBN: 0-13-067614-4, Sections 2.1, 3.1, 3.2, 5.5, 11.5.*

Steve Mueller; Scot Weber, "Removing Performance Bottlenecks Through JSP Precompilation", Jun. 20, 2002, SYS-CON Media, accessed and printed on Dec. 6, 2005 at <http://weblogic.sys-con.com/read/42878.htm>.*

(Continued)

Primary Examiner—Tuan Dam
Assistant Examiner—J. Derek Rutten
(74) Attorney, Agent, or Firm—Patterson & Sheridan, LLP

(57) ABSTRACT

Method and apparatus for processing java server pages (JSPs) which reduces the delays resulting from a first time invocation of a JSP. One embodiment provides a method for processing JSPs for a java virtual machine (JVM), comprising: selecting one or more JSP files to be processed for the JVM; translating the JSP files to java source code files; inserting quick exit codes to java source code files; compiling java source code files to servlet class files; and loading servlet class files into the JVM.

18 Claims, 6 Drawing Sheets

OTHER PUBLICATIONS

Doug Welzel, "Java Servlets", Oct. 1999, Linux Journal, Specialized Systems Consultants, Inc. Issue 66es, Article No. 27.*

"Preloading and compiling JSP's", Jul. 23, 2002, Usenet newsgroup ibm.software.webshpere.application-server.as400, archived by Google Groups and printed on Dec. 6, 2005.*

John Szuch, "Using the WAS 4.0 Pre-Touch Tool to Improve JSP Performance", Mar. 2003, MSP Custom Communications, eserver Magazine, accessed and printed Dec. 8, 2005 at <http://msptechmedia.com/iseries/tips/index.asp?sid=11&id=567&p=2>.*

* cited by examiner

SOFTWARE MECHANISM FOR EFFICIENT COMPILING AND LOADING OF JAVA SERVER PAGES (JSPS)

BACKGROUND OF THE INVENTION

1. Field of the Invention

The present invention generally relates to an improved data processing system. More particularly, the present invention relates to a method and apparatus for processing JSP® pages for an application server.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

The term "Internet" generally refers to the collection of networks and gateways that use the TCP/IP suite of protocols. Currently, the most commonly employed method of transferring data over the Internet is to employ the World Wide Web environment, also called simply "the Web". Other Internet resources exist for transferring information, such as File Transfer Protocol (FTP), but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser.

Web content is often dynamic because of various changes made by developers and other users publishing or making available web content, such as Web pages. Even static pages are occasionally updated. Web servers provide static content and dynamic content to various users. Static content contain data from files stored at a server. Dynamic content is constructed by programs executing at the time a request is made. Dynamic content is often present at a web site in an effort to provide customized pages and updated information to various users that may visit the site. Dynamic content may be provided utilizing JavaServer Pages® (JSP® pages), based on Java® platform technology. Compared to other methods of delivering dynamic content, JSP® pages provide advantages such as separation of dynamic and static contents (i.e., separation of application logic and web page design), which reduces the complexity of web site development and makes the site easier to maintain.

The first invocation of a JSP® page requires several preliminary steps which are performed once for the application server running the JSP® page. First, a temporary servlet source code (JAVA® source code) is created based on the contents of the JSP® page (i.e., filename.jsp file is translated to filename.java file). Second, the servlet source code is compiled into a servlet class file (i.e., filename.java file is translated to filename.class file). These two steps are performed only once until the JSP® page has been changed (i.e., the file containing the page is modified). Third, a bytecode verification is processed against the servlet class file. Fourth, a direct executable is generated for the servlet class file. Lastly, the direct executable is loaded into the Java® virtual machine on the application server. The last three steps are performed once per Java® virtual machine.

Although subsequent invocations of the same JSP® pages are generally fast because these preliminary steps are performed only one time, the first invocation of a JSP® pages may require substantial processing time, resulting in a noticeable delay to the end user. The delay problem is compounded when JSP® pages are written to invoke other JSP® pages, causing the total delay to be the serial sum of the processing time for each JSP® page.

Therefore, there is a need for a method and apparatus for processing JSP® pages for an application server which reduces the delays resulting from a first time invocation of a JSP® page.

SUMMARY OF THE INVENTION

The present invention generally provides methods and apparatus for processing JSP® pages for an application server which reduces the delays resulting from a first time invocation of a JSP® pages. One embodiment of the present invention provides a pre-touch mechanism that traverses through JSP® page and loads them into a Java® virtual machine for a given application (e.g., a Web Application such as IBM's WebSphere®). The pre-touch mechanism performs the preliminary steps required for execution of the JSP® pages prior to a first invocation of the JSP® pages by an end user. Thus, the pre-touch mechanism substantially reduces the processing time required for the first invocation of a JSP® page, and the end-user does not experience the typical delays presented by a first invocation of a JSP® page.

In one embodiment, the pre-touch mechanism adds one or more initialization parameters for a JSP® page processor which determine how the JSP® pages are to be processed for a JVM®. The initialization parameters include: prepareJSPs parameter, prepareJSPThreadCount parameter, and prepareJSPAttribute parameter. The prepareJSPs parameter allows an administrator to select which JSP® pages are processed through the pre-touch mechanism. The prepareJSPThreadCount parameter specifies a numeric value which indicates the number of threads to be spawned by the JSP® page processor for the pre-touch mechanism. The prepareJSPAttribute parameter allows a quick exit immediately after the class has been loaded into the JSP® page, and thus, avoids any overhead/inefficiency resulting from execution of the JSP® page's service method.

One embodiment provides a method for processing Java server pages (JSP® pages) for a Java® virtual machine, comprising: selecting one or more JSP® page files to be processed for the Java® virtual machine; translating the JSP® page files to Java® source code files; inserting quick exit codes to Java® source code files; compiling Java® source code files to servlet class files; and loading servlet class files into the Java® virtual machine.

Another embodiment provides a system for processing JSP® pages, comprising: an application server computer comprising one or more processors and a memory, the memory containing a JSP® page processor and a Java® virtual machine, wherein the JSP® page processor is configured to selectively load one or more JSP® page class files into the Java® virtual machine prior to user requests for JSP® page files.

Yet another embodiment provides a method for processing a JSP® page for a Java® virtual machine prior to a user request for the JSP® page, comprising: loading the JSP® page into the Java® virtual machine; invoking the JSP® page; and terminating execution of the JSP® page prior to execution of user codes in the JSP® page.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
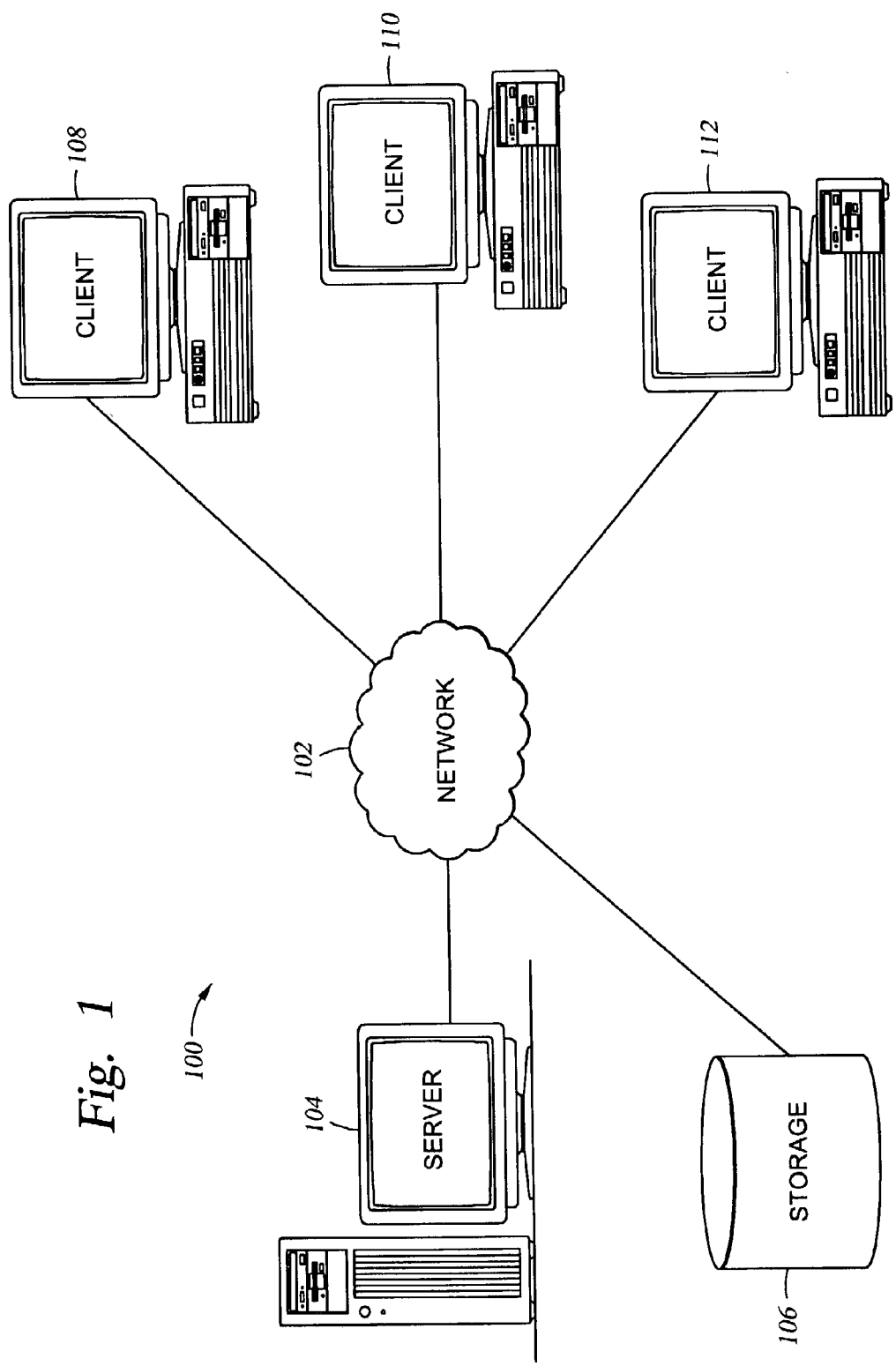
FIG. 1 depicts a pictorial representation of a distributed data processing system (also referred herein as a network environment) 100 in which the present invention may be implemented.

The present invention generally provides methods and apparatus for processing JSP® pages for an application server which reduces the delays resulting from a first time invocation of a JSP® page. One embodiment of the present invention provides a pre-touch mechanism that traverses through JSP® pages and loads them into a Java® virtual machine for a given application. The pre-touch mechanism performs the preliminary steps required for execution of the JSP® pages prior to a first invocation of the JSP® pages by an end user. Thus, the pro-touch mechanism substantially reduces the processing time required for the first invocation of a JSP® page, and the end-user does not experience the typical delays presented by a first invocation of a JSP® page. In one embodiment, the pre-touch mechanism adds one or more initialization parameters for the JSP® page processor which determine how the JSP® pages are to be processed for a Java® virtual machine.

Embodiments of the invention may be implemented as a program product for use with a computer system such as, for example, the network environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

With reference now to the figures, FIG. 1 depicts a pictorial representation of a distributed data processing system (also referred herein as a network environment) 100 in which the present invention may be implemented. The distributed data processing system 100 contains a network 102, which is the medium used to provide communications links between various devices and computers connected together within distributed data processing system 100. Network 102 may include permanent connections, such as wire or fiber optic cables, or temporary connections made through telephone connections. Further, network 102 may include wireless connections.

In the depicted example, a server computer 104 is connected to network 102 along with storage unit 106. In addition, client computers 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, the server 104 may provide data, such as boot files, operating system images, and applications to the clients 108–112, which are clients to server 104. The distributed date processing system 100 may include other forms of server systems (not shown), which also may provide data to clients 108–112. For example, one form of a server system may comprise two or more servers that have been logically associated with each other or interconnected as a cluster. The distributed data processing system 100 may include additional servers, clients, and other devices not shown.

In the depicted example, the network 102 is the Internet. The distributed data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
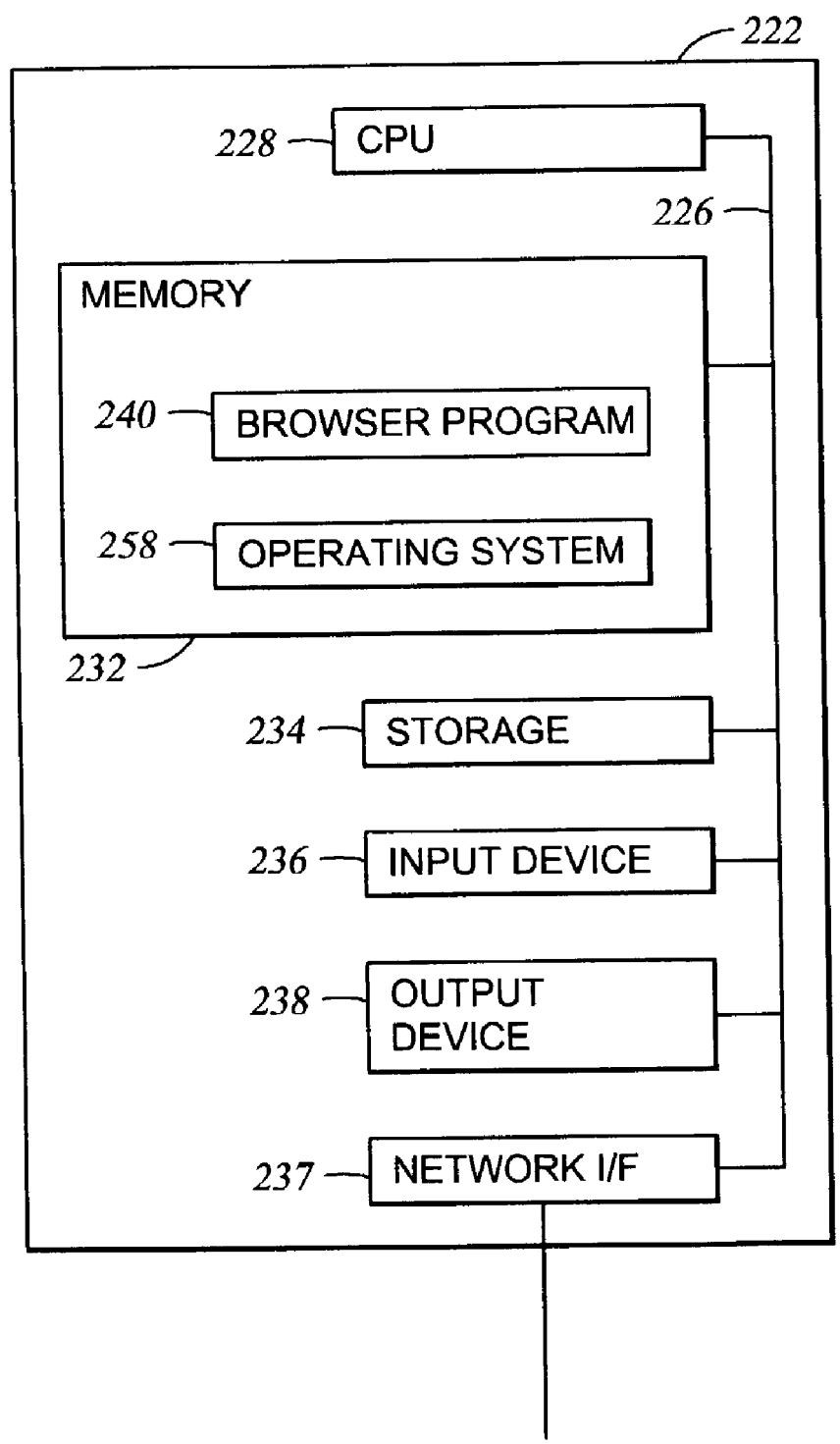
FIG. 2 is a block diagram illustrating one embodiment of a data processing system that may be implemented as a client computer.

FIG. 2 is a block diagram illustrating one embodiment of a data processing system that may be implemented as a client computer, such as client 108–112 in FIG. 1. The client computer 222 includes a Central Processing Unit (CPU) 228 connected via a bus 230 to a memory 232, storage 234, input device 236, output device 238 and a network interface device 237. The input device 236 can be any device to give input to the client computer 222. For example, a keyboard, keypad, light-pen, touch-screen, track-ball, or speech recognition unit, audio/video player, and the like could be used. The output device 238 is preferably any conventional display screen and, although shown separately from the input device 236, the output device 238 and input device 236 could be combined. For example, a display screen with an integrated touch-screen, and a display with an integrated keyboard, or a speech recognition unit combined with a text speech converter could be used.

The network interface component 237 may be any entry/exit component configured to allow network communications between the client computer 222 and the server computers 224 via the network 226. For example, the network interface component 237 may be a network adapter or other network interface card (NIC).

Memory 232 is preferably random access memory sufficiently large to hold the necessary programming and data structures of the invention. While memory 232 is shown as a single entity, it should be understood that memory 232 may in fact comprise a plurality of modules, and that memory 232 may exist at multiple levels, from high speed registers and caches to lower speed but larger DRAM chips. Memory 232 contains a browser program 240 that, when executed on CPU 228, provides support for navigating between the various servers 104 and locating network addresses at one or more of the servers 104. In one embodiment, the browser program 240 includes a web-based Graphical User Interface (GUI), which allows the user to display web pages located on the Internet.

The client computer 222 is generally under the control of an operating system 258, which is also located in memory 232. Illustrative operating systems which may be used to advantage include IBM's AIX operating system, Linux and Windows. More generally, any operating system supporting browser functions may be used.

Storage 234 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 232 and storage 234 could be part of one virtual address space spanning multiple primary and secondary storage devices.

Figure 3:
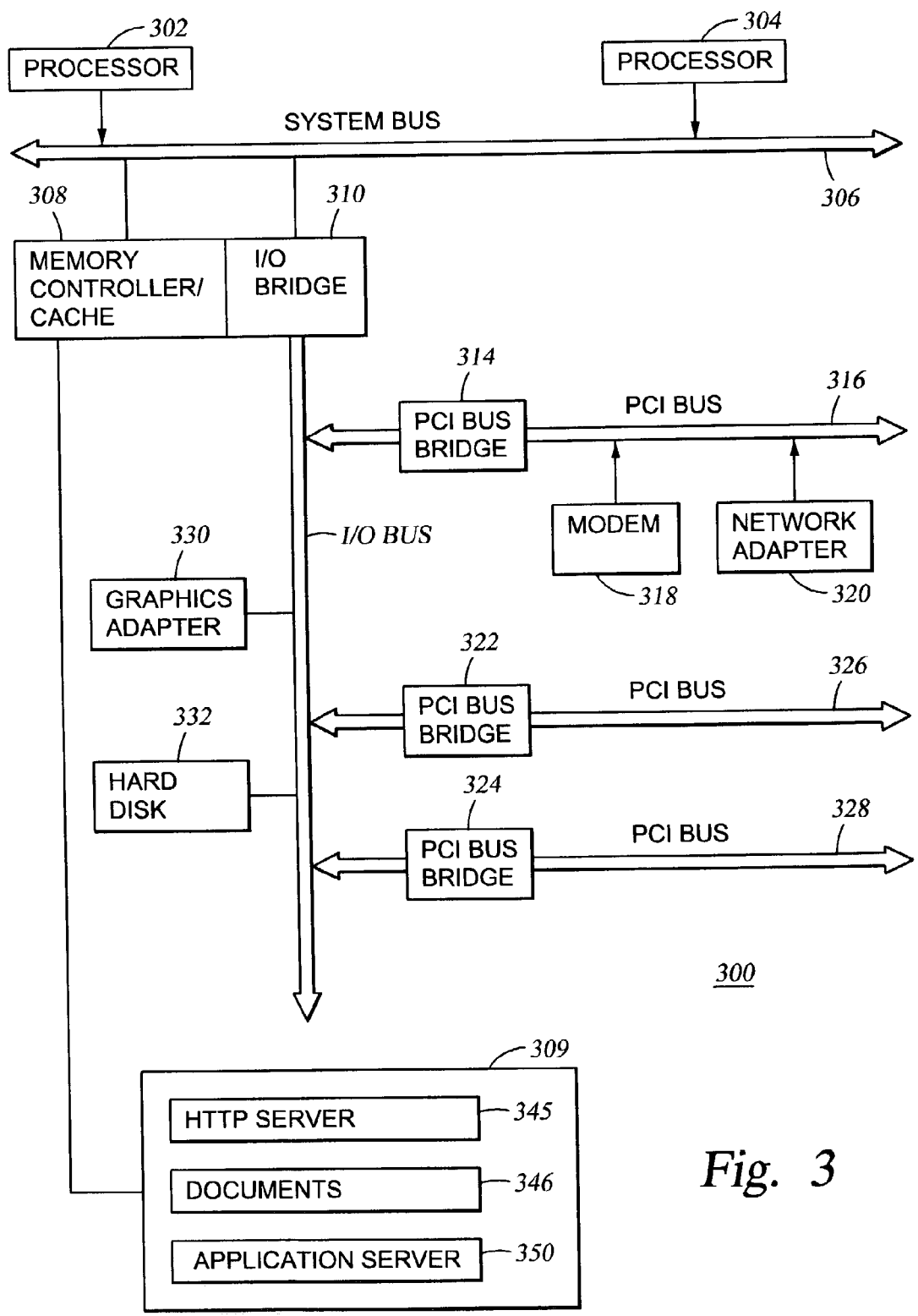
FIG. 3 is a block diagram illustrating one embodiment of a data processing system that may be implemented as a server system.

Referring to FIG. 3, a block diagram depicts one embodiment of a data processing system that may be implemented as a server system, such as server 104 in FIG. 1. Data processing system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

Memory 309 is a random access memory sufficiently large to hold the necessary programming and data structures that are located on the server computer 300. The programming and data structures may be accessed and executed by the processors 302, 304 as needed during operation. As shown, the memory 309 includes a Hypertext Transfer Protocol (HTTP) server process 345 adapted to service requests from the client computers. For example, process 345 may respond to requests to access electronic documents 346 (e.g., HTML documents) residing in server memory 309 or storage 332. The http server process 345 is merely illustrative and other embodiments adapted to support any known and unknown protocols are contemplated, The memory 309 also includes an application server 350, such as IBM's WebSphere® Application Server. The application server 350 provides a JAVA® enabled environment for processing servlets and JSP® pages and handles browser requests for servlets and JSP® pages.

Peripheral component interconnect (PCI) bus bridge 314 connected to I/O bus 312 provides an interface to PCI local bus 316. A number of modems may be connected to PCI bus 316. Typical PCI bus implementations will support a plurality of PCI expansion slots or add-in connectors. Communications links to network computers 108–112 in FIG. 1 may be provided through modem 318 and/or network adapter 320 connected to PCI local bus 316 through add-in boards.

Additional PCI bus bridges 322 and 324 provide interfaces for additional PCI buses 326 and 328, from which additional modems or network adapters may be supported. In this manner, server 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The data processing system depicted in FIG. 3 may be, for example, an IBM RISC/System 6000 system, a product of International Business Machines Corporation in Armonk, N.Y., running the Advanced Interactive Executive (AIX) operating system.

Figure 4:
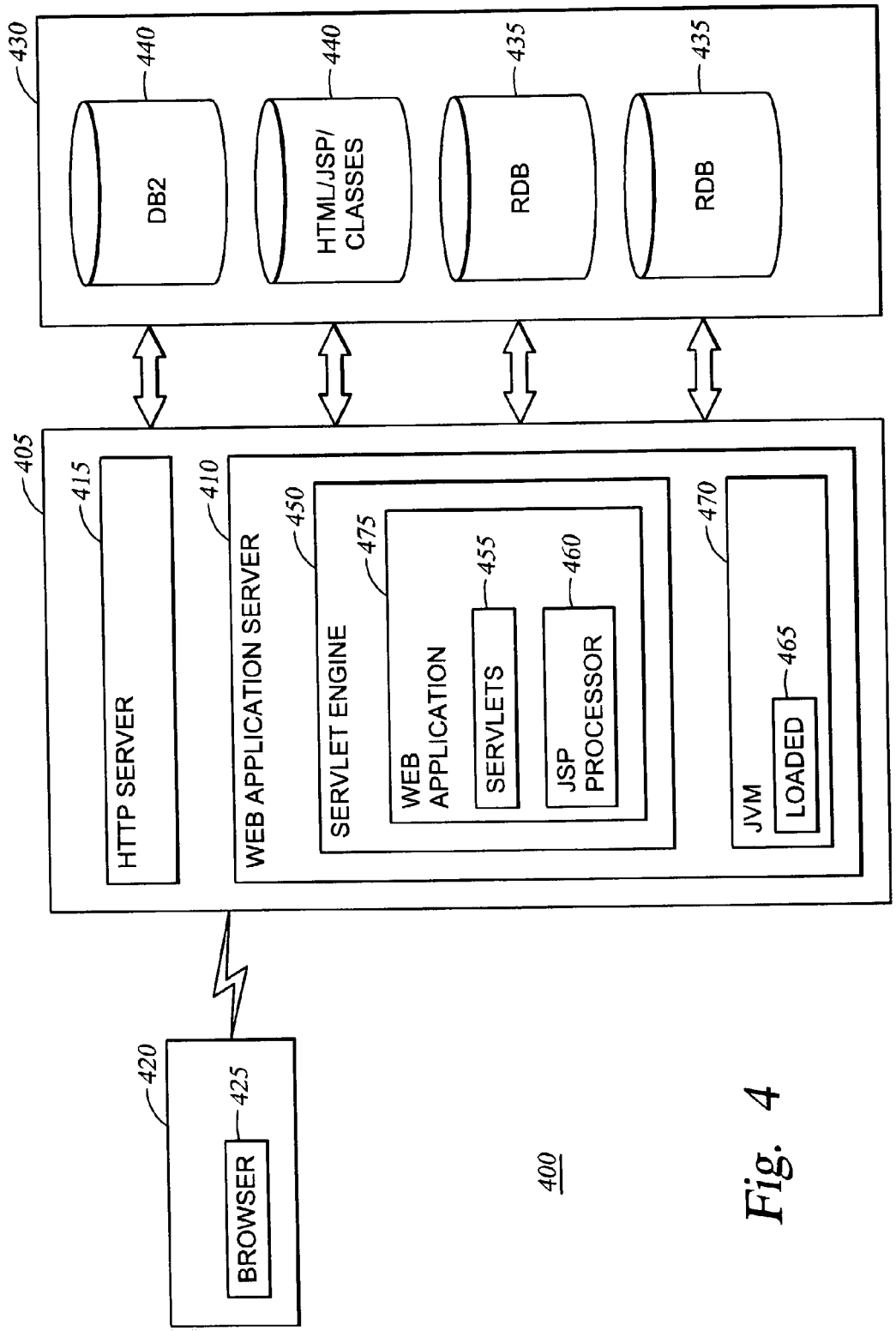
FIG. 4 is a block diagram illustrating an execution environment 400 for a Web application server 410.

FIG. 4 is a block diagram illustrating an execution environment 400 for a Web application server 410. As shown in FIG. 4, the execution environment 400 includes a server system 405 containing a Web application server 410 and an HTTP server 415 (i.e., one embodiment of server system 300, application server 350 and HTTP server 345). A client system 420 having a browser 425 (i.e., one embodiment of client system 222 and browser 240) is also disposed in communication with the server system 405. Storage devices 430 (i.e., one embodiment of storage 106) containing one or more relational databases 435 may also disposed in communication with the server system 405. These relational databases may include a DB2 database 440, a database 445 containing classes and HTML/JSP® page files. The Web application server 410 includes a servlet engine 450 for processing a Web application 475 containing servlets 455 and a JSP® page processor 460. The servlet engine 450 is program that runs within the application server 410 and handles the requests for servlets, JSP® pages and other server-side coding. The servlet engine 450 creates instances of servlets, initiates servlets, acts as a request dispatcher, and maintains servlet context for use by the server applications. The JSP® page processor 460 processes loaded JSP® pages 465 which have been translated and loaded into a Java® virtual machine 470 for execution. The JSP® page processor 460 also processes JSP® pages for their first time loading into a Java® virtual machine. Additionally, the JSP® page processor 460 may also receive requests from a client to a JSP® page and generate responses from the JSP® page to the client.

The Java® virtual machine is a virtual computer component that resides only in memory. The term "Java® virtual machine" is a Java specific term for "address space." Accordingly, in one embodiment, Java® virtual machine is used herein interchangeably with "address space." The Java® virtual machine allows Java programs to be executed on different platforms as opposed to only the one platform for which the code was compiled. In this manner, Java® is able to support applications for many types of data processing systems, which may contain a variety of central processing units and operating systems architectures. To enable a Java® application to execute on different types of data processing systems, a compiler typically generates an architecture-neutral file format—the compiled code is executable on many processors, given the presence of the Java® run time system. The Java® compiler generates bytecode instructions that are non-specific to particular computer architectures. A bytecode is a machine independent code generated by the Java® compiler and executed by a Java® interpreter. A development environment, such as the Java Development Kit® (JDK®) available from Sun Microsystems, Inc., may be used to build Java® byte code from Java® language source code and libraries.

One embodiment of the present invention provides a pre-touch mechanism that traverses through JSP® pages and loads them into a Java® virtual machine for a given application (e.g., a Web Application such as IBM's WebSphere®). The pre-touch mechanism performs the preliminary steps required for execution of the JSP® pages prior to a first invocation of the JSP® pages by an end user. Thus, the pre-touch mechanism substantially reduces the processing time required for the first invocation of a JSP® page, and the end-user does not experience the typical delays presented by a first invocation of a JSP® page. In one embodiment, the pre-touch mechanism adds one or more initialization parameters for the JSP® page processor. The initialization parameters include: prepareJSPs parameter, prepareJSPThread-Count parameter, and prepareJSPAttribute parameter.

The prepareJSPs parameter specifies a kilobyte threshold value. This parameter is first utilized to determine whether to proceed with the pre-touch mechanism for all the JSP® pages to be processed for the particular Web application. When This parameter is specified, all JSP® pages to be processed for the particular Web application are translated from the filename.jsp file to the filename.java file and then compiled to the filename.class file. For each of these JSP ® pages whose kilobyte size exceeds the kilobyte threshold value, the JSP® page is processed for bytecode verification, generation of a direct executable, and loading of the direct executable into the Java® virtual machine. Since the amount of JSP® page processing time is generally proportional to the size of the JSP® page source file, the prepareJSPs parameter allows an administrator to select which JSP® page are processed through the pre-touch mechanism. If the prepareJSPs parameter is specified as zero kilobytes, each JSP® page is processed through the pre-touch mechanism.

The prepareJSPThreadCount parameter specifies a numeric value which indicates the number of threads to be spawned by the JSP® page processor for the pre-touch mechanism. Multiple threads enable parallel processing of JSP® pages and utilize more efficiently the available CPUs on the server system.

The prepareJSPAttribute parameter specifies an alphanumeric string value. The existence of this parameter is checked at the starting execution of the JSP® page. If the parameter is specified, the JSP® page performs a quick exit before attempting to execute any user code within the JSP® page. The prepareJSPAttribute parameter provides an important function for the pre-touch mechanism in eliminating inefficiencies and errors/exceptions caused by JSP® pages being called or executed out of context. Typically, to load a JSP® page class file into a Java® virtual machine requires invocation of The JSP® page's service method. However, even just invoking a JSP® page to achieve classloading into the Java® virtual machine can be a problem because the JSP® page is being called out of context. Since JSP® pages, often require Java® classes to be passed in when called, being called out of context can cause exceptions to be generated, resulting in inefficiency. Even if no errors are logged, there is no point to allowing the JSP® page's entire service method to run to completion. The prepareJSPAttribute parameter allows a quick exit immediately after the class has been loaded into the Java® virtual machine, and thus, avoids any overhead/inefficiency resulting from execution of the JSP® page's service method.

As exemplified by FIG. 4, one embodiment of the pre-touch mechanism is implemented utilizing a JSP® page processing servlet (or JSP® page processor 460) residing on the application server 410. For example, the JSP® page processing servlet (e.g., in IBM's WebSphere) will check these attributes (i,e., initialization parameters) and perform the required tasks for processing the JSP® pages.

Figure 5A:
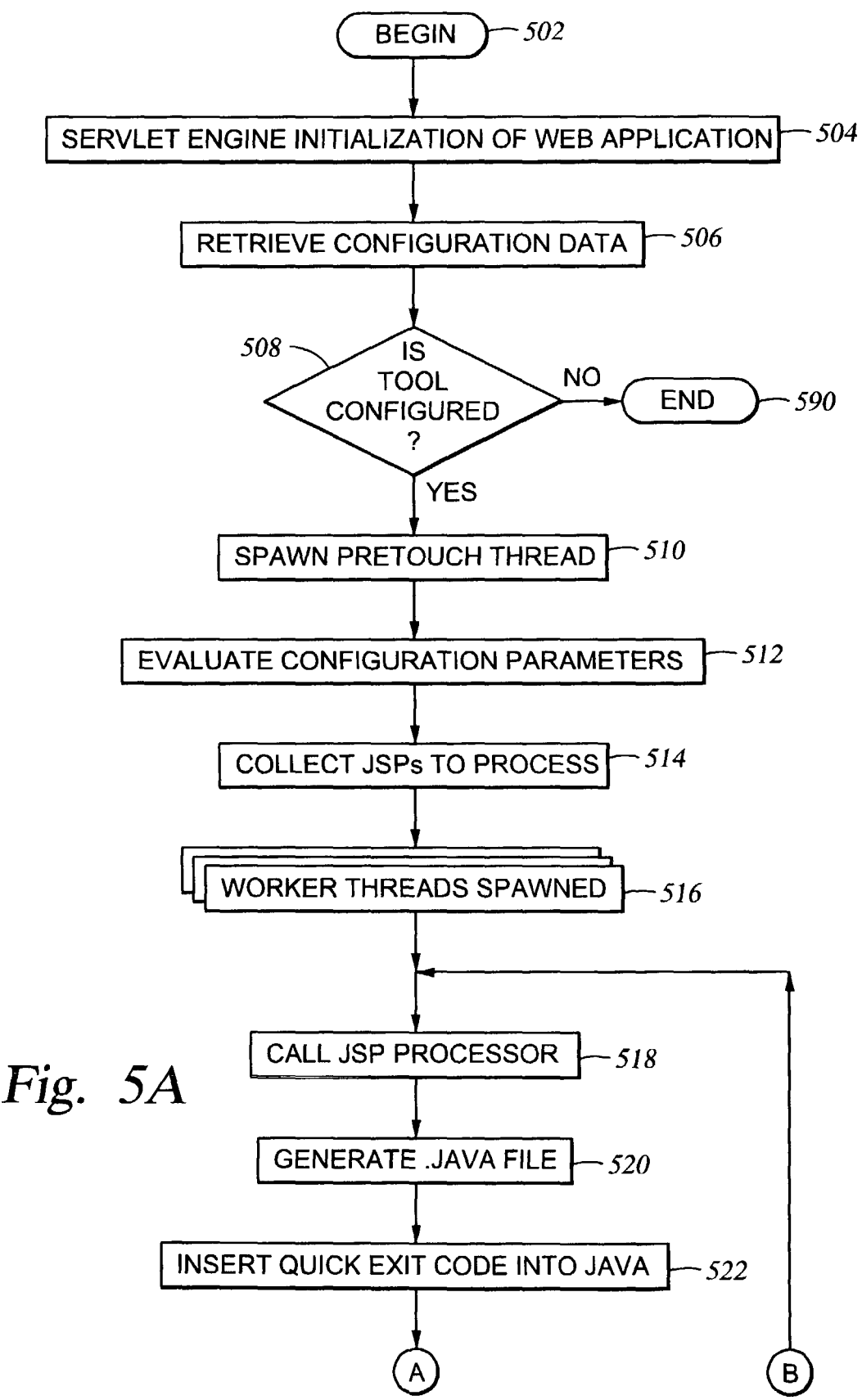
FIG. 5 is a flow diagram illustrating one embodiment of a method of processing JSP® pages utilizing a pre-touch mechanism.
Figure 5B:
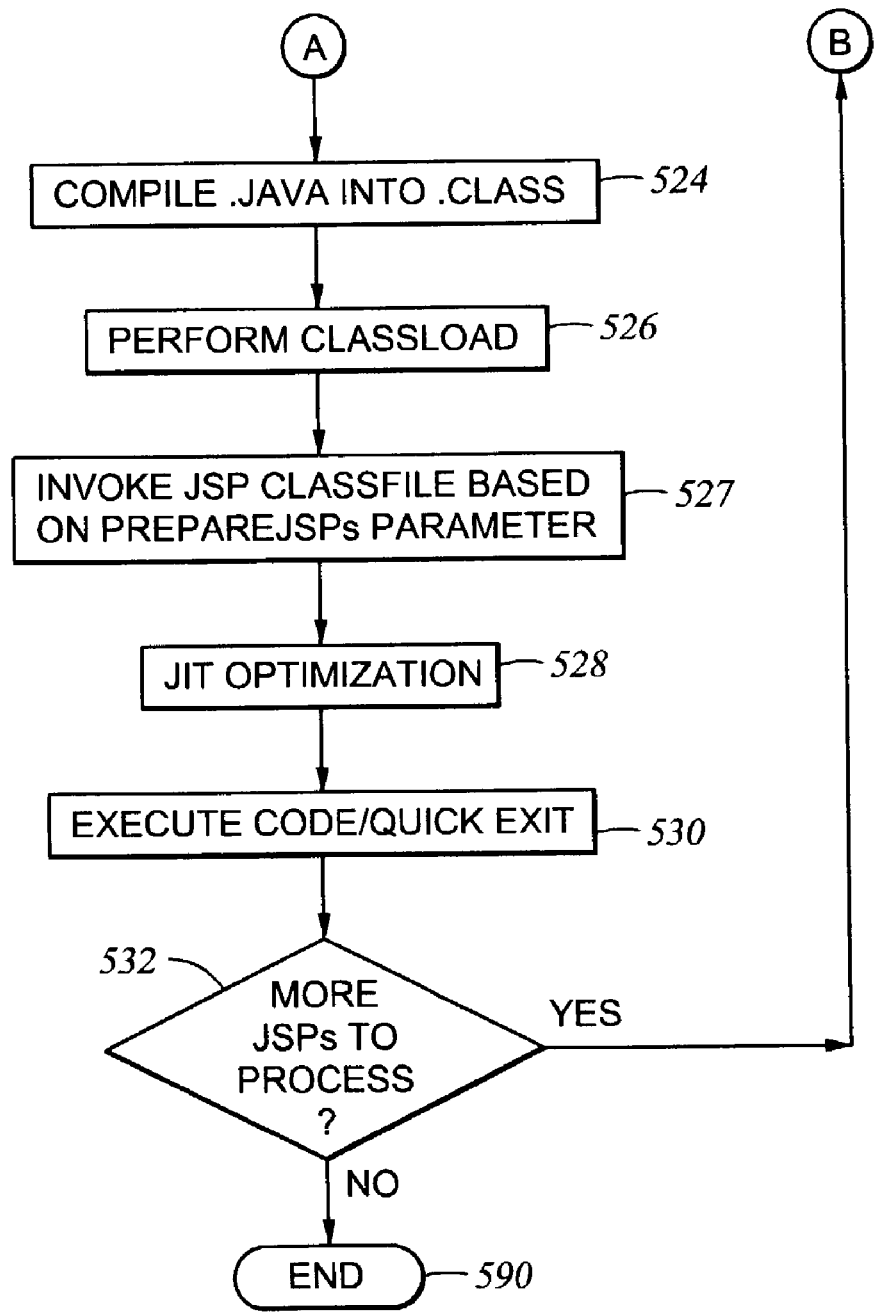

FIG. 5 is a flow diagram illustrating one embodiment of a method of processing java server pages utilizing the pre-touch mechanism. The method 500 starts at block 502 and proceeds to initialize the web application at block 504. Although this illustrated embodiment is described along with an initialization of a Web application, it is contemplated that the method may be performed separately from an initialization of a Web application. In one embodiment, the servlet engine 450 processes the initialization of the web application 475. The method 500 then proceeds to retrieve configuration data at block 506 to determine whether the JSP® page processor 460 is configured for performing the Pre-touch mechanism (block 508). In one embodiment, the method 500 check for the presence of the prepareJSPs initialization parameter in the JSP® page processor 460. If the prepareJSPs parameter is not specified or does not exist, the pre-touch mechanism is not launched and the method 500 ends at block 590.

If the presence of The prepareJSPs parameter is validated, a pre-touch thread is spawned (block 510) from the servlet engine's initialization of the Web application. Once the pre-touch thread has been spawned, the servlet engine 450 may proceed or resume with other tasks while the pre-touch thread continues. The configuration parameters for the pre-touch mechanism are evaluated at block 512, and the JSP® pages to be processed for the Web Application are collected at block 514. Next, at block 516, a plurality of worker threads are spawned to process the JSP® pages. The number of threads spawned is specified by the prepareJSPThreadCount parameter. All Threads process the JSP® pages contemporaneously, and each thread may process a plurality of JSP® pages sequentially and continuously.

For each thread spawned, the following steps are performed for each JSP® page processed. The JSP® page processor 460 is called at block 518, and the .jsp file is translated into a .java file (i.e., java source code) at block 520. At block 522, a quick exit code is inserted into the .java file utilizing the prepareJSPAttribute parameter. The quick exit code generally represents java source code which, after the class file has been loaded into the Java® virtual machine and at the beginning of the execution of the JSP® page, causes the JSP® page to check for the existence of the prepareJSPAttribute parameter. The .java file is then compiled into a .class file (i.e., servlet class file) at block 524. At block 526, the JSP® page processor 460 performs a classload function for the JSP® page whose size exceeds the kilobyte threshold value defined by the prepareJSPs parameter. In one embodiment, a bytecode verification is processed against the .class file. Then, the .class file is loaded into the Java® virtual machine 470. After class loading, the servlet class file is invoked based on the prepareJSPs initialization parameter at block 527. Thus, only the JSP® pages whose size exceed the kilobyte threshold value are invoked after classloading.

At block 528, the .class file undergoes JIT (just in time) optimization, producing a direct executable (unless the Java® virtual machine is not configured to process the JSP® page in interpret mode, in which case the Java® virtual machine will execute the .class file bytecodes directly). At block 530, the JSP® page's direct executable code is executed with an input parameter containing the prepareJSPAttribute parameter value, causing the JSP® page execution to immediately exit without executing user code (i.e., the portion of the code which responds to the user request in generating the dynamic contents). The method 500 then checks whether there are any remaining JSP® pages to be processed at block 532. If there are remaining JSP® pages to be processed, the method 500 returns to block 518 to process the next JSP® page. When all JSP® pages have been processed, the method 500 ends at block 590.

The method 500 processes all JSP® pages to be loaded for a particular Java® virtual machine based on the initialization parameters prior to receiving a user request. The loaded JSP® page in the Java® virtual machine is ready to be executed when called by a user (client) without the need to be translated, compiled and loaded. Thus, the method 500 substantially reduces the processing time required when an end user requests a JSP® page. When a user (client) requests a JSP® page (either directly or indirectly) which has already been loaded into a Java® virtual machine and ready to be executed, the user does not experience the typical delays. Furthermore, the pre-touch mechanism substantially reduces the delays when an end user requests a JSP® page that calls other JSP® pages. The pre-touch mechanism may also be applied whenever a JSP® page has been modified and need to be translated, compiled and loaded into a Java® virtual machine again.

While the foregoing is directed to embodiments of the present invention, other and further embodiments of the invention may be devised without departing from the basic scope thereof, and the scope thereof is determined by the claims that follow.

What is claimed is:

1. A method for processing Java® server pages, comprising:
   selecting at least one Java® server page to be processed, prior to receiving any client requests for the at least one Java® server page;
   translating the at least one Java® server page into a Java® source code file;
   inserting a quick exit code into the Java® source code file;
   compiling the Java® source code files to generate a servlet;
   loading the servlet into a memory of a virtual machine and invoking the servlet on the virtual machine, wherein the quick exit code causes the servlet to exit before a service method associated with the servlet is invoked.

2. The method of claim 1, wherein the Java® server pages are processed during an initialization of a Web application.

3. The method of claim 1, further comprising selecting the at least one Java® server page by selecting server pages which exceed a size threshold value.

4. The method of claim 1, further comprising generating a direct executable via just in time optimization.

5. The method of claim 1, further comprising spawning a plurality of threads to process the selected Java® server pages.

6. The method of claim 5, wherein a thread count initialization parameter specifies a number of threads to be spawned.

7. A computer readable medium containing a program which, when executed, performs an operation, comprising:
   selecting at least one Java® server page to be processed;
   translating the at least one Java® server page into a Java® source code file;
   inserting a quick exit code into the Java® source code file;
   compiling the java® source code files to generate a servlet;
   loading the servlet into a memory of a virtual machine; and
   invoking the servlet on the virtual machine, wherein the quick exit code causes the servlet to exit before a service method associated with the servlet is invoked.

8. The computer readable medium of claim 7, wherein the operation further comprises selecting the at least one Java® server page by selecting server pages file which exceed a size threshold value.

9. The computer readable medium of claim 7, wherein the operation further comprises generating a direct executable via just in time optimization.

10. The computer readable medium of claim 7, wherein the operation further comprises spawning a plurality of threads to process the selected Java® server pages.

11. A computer for processing one or more Java® server pages, comprising:
    an application server computer comprising one or more processors and a memory, the memory containing a Java® server pages processor and a virtual machine, wherein the Java® server pages processor is configured to:
    select at least one of the Java® server pages to be processed;
    translate the Java® server page file into a Java® source code file;
    insert quick exit codes into the Java source code file;

compile the Java® source code file to generate a servlet;

selectively load one or more servlets generated from the one or more Java® server pages into a memory of the virtual machine prior to a user request for one of the Java® server pages; and invoke the servlet on the virtual machine, wherein the quick exit codes cause the servlet to exit before a service method associated with the servlet is invoked.

12. The computer of claim 11, wherein the memory further comprises a servlet engine for initializing a web application which utilizes the one or more Java™ server pages.

13. The computer system of claim 12, wherein the servlet engine is configured to spawn a plurality of threads to process the Java™ server pages.

14. The computer of claim 11, wherein the Java® server pages processor is further configured to select the Java® server pages by selecting a server pages which exceed a size threshold value.

15. The computer of claim 11, wherein the Java® server pages processor is further configured to generate a direct executable via just in time optimization.

16. A method for processing Java® server pages, comprising:

initializing a web application that includes a virtual machine;

selecting at least one Java® server pages to be processed for the virtual machine, wherein the at least one Java® server pages is selected by selecting server pages which exceed a size threshold value;

translating the Java® server pages into a Java® source code file;

inserting a quick exit code into the Java® source code file;

compiling the Java® source code file to generate a servlet;

loading the servlet into a memory of the virtual machine; and invoking the servlet on the virtual machine, wherein the quick exit code causes the servlet to exit before a service method associated with the servlet is invoked.

17. The method of claim 16, further comprising generating a direct executable via just in time optimization.

18. The method of claim 16, further comprising spawning a plurality of threads to process the selected Java® server pages.

* * * * *